E. F. W. ALEXANDERSON.
DYNAMO ELECTRIC MACHINE.
APPLICATION FILED JULY 7, 1911.
1,091,614.
Patented Mar. 31, 1914.
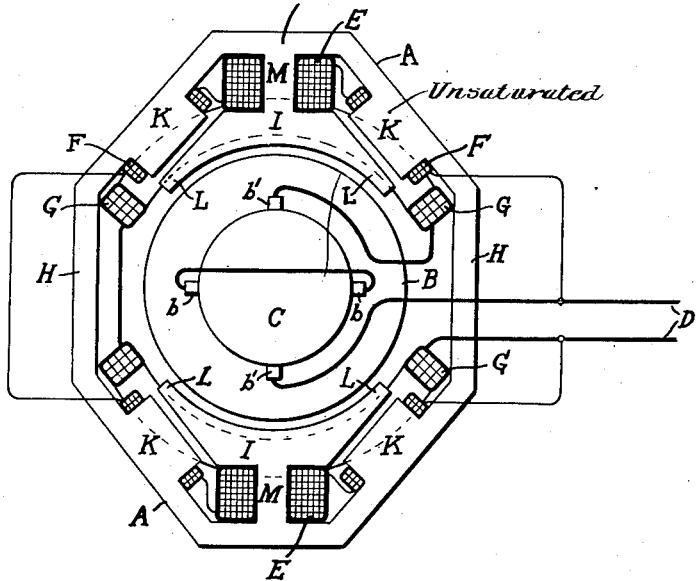
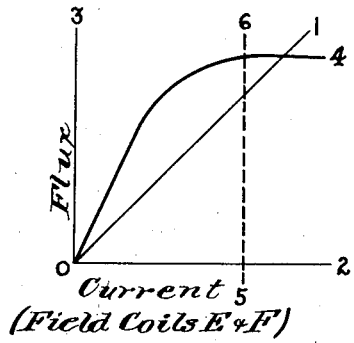
WITNESSES:
J. Earl Ryan
J. Ellis Glen
INVENTOR.
ERNST F. W. ALEXANDERSON,
BY
HIS ATTORNEY

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

DYNAMO-ELECTRIC MACHINE.

1,091,614.  Specification of Letters Patent.  Patented Mar. 31, 1914.

Application filed July 7, 1911. Serial No. 637,251.

*To all whom it may concern:*

Be it known that I, ERNST F. W. ALEXANDERSON, a citizen of the United States, residing at Schenectady, in the county of Schenectady, State of New York, have invented certain new and useful Improvements in Dynamo-Electric Machines, of which the following is a specification.

My invention relates to dynamo electric machines and has for its object to produce such a machine which will maintain constant voltage, regardless of variations in load on the external circuit or variations in speed.

Heretofore it has been proposed to obtain constant voltage generators for varying speeds and loads by means of regulators, or the like, which are external to the machine. By my invention I obtain a constant voltage generator for varying speeds and loads without the use of such regulators, that is, the regulation is inherent in my machine.

My invention will best be understood by reference to the following description taken in connection with the accompanying drawing, in which—

Figure 1 shows a machine arranged in accordance with my invention and Fig. 2 is an explanatory diagram.

Referring to Fig. 1, A represents the field magnet of a dynamo electric machine of the direct current type, having an armature B, the windings of which are connected to a commutator C. Mounted on the commutator C are two sets of commutator brushes $b, b$ and $b', b'$. The brushes $b, b$ are connected in a local circuit on a line displaced substantially 90 electrical degrees from the line of field magnetization. The second set of brushes $b', b'$ are displaced substantially 90 electrical degrees from the first set and are connected to an external circuit D. The field magnet is provided with two field windings E and F, connected to produce opposing and unequal magneto-motive forces, one of which is arranged to produce a substantially constant flux, the other of which is arranged to produce a variable flux, whereby the voltage of the external circuit D is maintained substantially constant independently of the load, or the speed variations of the armature B.

The rotation of the armature B in the field produced by the pole pieces of the field magnet A generates a difference of potential between the brushes $b, b$, which results in a short circuit current flowing through these brushes and the local circuit in which they are included. This short circuit current produces a secondary magnetization substantially at right angles to the line of field magnetization, and the rotation of the armature in the field produced by this secondary magnetization generates an electro-motive force between the brushes $b', b'$, which electromotive force is impressed upon the external circuit. Therefore, the field which is effective for producing a voltage between the brushes $b', b'$ is the secondary field produced by the short circuit current between the brushes $b, b$. In turn, this short circuit current depends upon that part of the magnetic field produced by the windings E and F which is cut by the armature conductors. The windings E and F are connected to produce opposing and unequal magneto-motive forces, the portion of the field magnet on which E, the stronger of the opposing field windings is wound, being saturated and the portion of the field magnet on which F, the other of said opposing windings is wound, being unsaturated.

The field magnet structure comprises a yoke H and pole pieces I and K. The field windings E are wound on restricted portions M of the pole pieces I, while the windings F are wound on the pole pieces K. The pole pieces I have massive portions offering a path of low reluctance to the armature flux which produces the secondary field by reason of the long extending tips L, and connecting portions M between the yoke and the pole tips. The pole pieces K are of large cross-section and consequently unsaturated and of the opposite polarity to that of the corresponding pole pieces I. I have shown the pole pieces K as extending between the yoke H and the pole tips L. The flux produced in the field poles I is therefore substantially constant, while the flux produced in the field poles K varies with the voltage of the circuit D, in shunt with which the windings E and F are connected. Since the winding E is stronger than the winding F, the flux of the pole pieces I is stronger than that of the pole pieces K, but, as the corresponding pole pieces are of opposite polarity, a portion of the flux of the pole pieces I, substantially equal to that of the pole pieces K, does not pass through the armature, but finds a local path through the pole pieces K and the magnet frame. Consequently the flux, which is effective for producing a voltage between the brushes $b, b$, is the difference between the fluxes produced in the field poles I and K.

The voltage between the brushes $b, b$, produces the short circuit current and in turn the secondary field in which the armature B rotates, as explained above. This is shown diagrammatically in Fig. 2, in which the abscissas on the axis $O^2$ represent the voltage of the circuit D, or the current in the field coils E and F on the poles I and K, since this current is proportional to the voltage. Ordinates on the axis $O^3$ represent the flux passing through the poles. The curve $O^4$ is the curve of magnetization of the poles I, while the straight line curve $O^1$ is the curve of magnetization of the poles K. Due to the fact that the pole pieces I have a portion M of restricted cross-section, their curve of magnetization is substantially flat at that part of the curve at which the dynamo electric machine operates, but, since the pole pieces K are of large cross-section, their curve of magnetization is substantially a straight line having a constant slope to the axis $O^2$. The machine operates approximately at the point of these curves intersected by the dotted line 5—6. At this point it will be noted that the magnetization of the saturated poles I is practically constant. Since a portion of the flux of the poles I, substantially equal to the flux of the poles K, passes through the poles K without passing through the armature, the voltage induced between the brushes $b, b$ is proportional to the difference at this point between the ordinates of the curve $O^4$ and the straight line $O^1$, that is, proportional to the small portion of the dotted line 5—6 which is included between these curves. If the voltage of the load circuit rises a very small amount for any cause, such as an increase of speed, a corresponding increase in the currents in the field coils E and F is produced. The effect is to shift the dotted line 5—6 a small amount toward the right. Even a very small shift of this line will greatly decrease the length of the portion of this line included between the curve $O^4$ and the curve $O^1$, so that the voltage between the exciting brushes $b, b$, and consequently the field produced by the short circuit current through these brushes, is very materially reduced, and the tendency to increase the voltage in the load circuit is offset by a reduction of the strength of the secondary field in which the armature rotates. Similarly a very slight decrease of voltage on the load circuit D produces a very great increase in the exciting voltage. In this way, very close regulation is obtained which is wholly independent of speed and of load variations.

The brushes $b', b'$ are so placed that the armature current that flows through them tends to demagnetize the primary field and reduce its strength so that the voltage between the brushes does not remain constant. In order to compensate for this demagnetizing effect on the primary field, or, in other words, for the armature reaction, I employ a compensating winding G, so that the only field which is effective for producing a voltage between the brushes $b'$, $b'$ is the secondary field produced by the short circuit current between the brushes $b, b$.

Although I have shown and described two sets of commutator brushes, one of which is connected in a local circuit for producing a secondary magnetic field and the other of which is connected to an external circuit, it is evident that other well known arrangements may be used. Neither in this respect, nor in any other, do I desire to limit myself to the particular arrangement and construction of parts shown and described, and I aim in the appended claims to cover all modifications which do not depart from the spirit and scope of my invention.

What I claim as new and desire to secure by Letters Patent of the United States, is:

1. In a dynamo electric machine, a field magnet, an armature provided with a commutator, commutator brushes and connections forming for said brushes a local circuit for producing a secondary magnetic field and an external circuit, and means for producing in said field magnet in inductive relation to the armature coils connected to the brushes included in the local circuit an effective flux which is the difference of two fluxes, one being a substantially constant flux and the other a flux proportional to the voltage between the brushes connected to the external circuit.

2. In a dynamo electric machine, a field magnet, an armature provided with a commutator, commutator brushes and connections forming for said brushes a local circuit for producing a secondary magnetic field and an external circuit, means for compensating for the armature reaction, and means for producing in said field magnet in inductive relation to the armature coils connected to the brushes included in the local circuit an effective flux which is the difference of two fluxes, one being a substantially constant flux and the other a variable flux.

3. In a dynamo electric machine, a field magnet, an armature provided with a commutator, commutator brushes and connections forming for said brushes a local circuit for producing a secondary magnetic field and an external circuit, means for compensating for the armature reaction, and means for producing in said field magnet in inductive relation to the armature coils connected to the brushes included in the local circuit an effective flux which is the difference of two fluxes, one being a substantially constant flux and the other a flux proportional to the voltage between the brushes connected to the external circuit.

4. In a dynamo electric machine, a field magnet, an armature provided with a commutator, commutator brushes and connections forming for said brushes a local circuit for producing a secondary magnetic field and an external circuit, and two field windings connected to produce in said field magnet in inductive relation to the armature coils connected to the brushes included in the local circuit opposing and unequal magneto-motive forces, one arranged to produce a substantially constant flux, and the other to produce a variable flux.

5. In a dynamo electric machine, a field magnet, an armature provided with a commutator, commutator brushes and connections forming for said brushes a local circuit for producing a secondary magnetic field and an external circuit, a winding for compensating for the armature reaction, and two field windings connected to produce opposing and unequal magneto-motive forces, one arranged to produce a substantially constant flux, and the other to produce a variable flux, whereby the voltage of said dynamo electric machine is maintained substantially constant.

6. In a dynamo electric machine, a field magnet, an armature provided with a commutator, commutator brushes and connections forming for said brushes a local circuit for producing a secondary magnetic field and an external circuit, and two field windings connected to produce opposing and unequal magneto-motive forces, the portion of the field magnet on which the stronger of said opposing field windings is wound being saturated, and the portion of the field magnet on which the other of said opposing windings is wound being unsaturated.

7. In a dynamo electric machine, a field magnet, an armature provided with a commutator, commutator brushes and connections forming for said brushes a local circuit for producing a secondary magnetic field and an external circuit, and two field windings connected to produce in said field magnet in inductive relation to the armature coils connected to the brushes included in the local circuit opposing and unequal magneto motive forces, the portion of the field magnet on which the stronger of said opposing field windings is wound being saturated and the portion of the field magnet on which the other of said opposing windings is wound being unsaturated.

8. In a dynamo electric machine, a field magnet, an armature provided with a commutator, commutator brushes and connections forming for said brushes a local circuit for producing a secondary magnetic field and an external circuit, and two field windings producing opposing and unequal magneto-motive forces, the portion of the field magnet on which the stronger of said opposing windings is wound being saturated, and the portion of the field magnet on which the other of said opposing windings is wound being unsaturated, said field windings being connected in shunt to said external circuit.

9. In a dynamo electric machine, a field magnet having a leakage path of low reluctance for the armature flux, an armature provided with a commutator, commutator brushes and connections forming for said brushes a local circuit for producing a secondary magnetic field and an external circuit, and two field windings connected to produce opposing and unequal magneto-motive forces, the portion of the field magnet on which the stronger of said opposing field windings is wound being of restricted cross section so as to be saturated, and the portion of the field magnet on which the other of said opposing windings is wound being unsaturated.

10. In a dynamo electric machine, a field magnet having a leakage path of low reluctance for the armature flux, an armature provided with a commutator, commutator brushes and connections forming for said brushes a local circuit for producing a secondary magnetic field and an external circuit, and two field windings producing opposing and unequal magneto-motive forces in inductive relation to said local circuit the portion of the field magnet on which the stronger of said opposing windings is wound being of restricted cross section so as to be saturated, and the portion of the field magnet on which the other of said opposing windings is wound being unsaturated, said field windings being connected in shunt to said external circuit.

11. In a dynamo electric machine, a field magnet structure, an armature provided with a commutator, commutator brushes and connections forming for said brushes a local circuit for producing a secondary magnetic field and an external circuit, said field magnet structure comprising a yoke, pole pieces having massive portions offering a path of low reluctance to the armature flux and connecting portions of restricted cross section between the yoke and said massive portions, and other pole pieces, and two field windings connected to produce opposing and unequal magneto-motive forces, the stronger of said opposing field windings being wound on said first mentioned pole pieces, and the other of said opposing windings being wound on said other pole pieces.

12. In a dynamo electric machine, a field magnet structure, an armature provided with a commutator, commutator brushes and connections forming for said brushes a local circuit for producing a secondary magnetic field and an external circuit, said field magnet structure comprising a yoke, pole pieces having massive portions offering a path of low reluctance to the armature flux and connecting portions of restricted cross section between said yoke and said massive portions, and other pole pieces, and two field windings producing opposing and unequal magneto-motive forces, the stronger of said opposing field windings being wound on said first mentioned pole pieces, and the other of said opposing windings being wound on said other pole pieces, said field windings being connected in shunt to said external circuit.

13. In a dynamo electric machine, a field magnet structure, an armature provided with a commutator, commutator brushes and connections forming for said brushes a local circuit for producing a secondary magnetic field and an external circuit, said field magnet structure comprising a yoke, pole pieces having extending pole tips and connecting portions of restricted cross section between the yoke and pole tips, and other pole pieces of large cross section extending between the yoke and said pole tips but separated from said pole tips by an air gap, and two field windings connected to produce opposing and unequal magneto-motive forces, the stronger of said opposing field windings being wound on said first mentioned pole pieces, and the other of said opposing windings being wound upon the other pole pieces.

14. In a dynamo electric machine, a field magnet structure, an armature provided with a commutator, commutator brushes and connections forming for said brushes a local circuit for producing a secondary magnetic field and an external circuit, said field magnet structure comprising a yoke, pole pieces having extending pole tips and connecting portions of restricted cross section between the yoke and the pole tips, and other pole pieces of large cross section extending between the yoke and said pole tips but separated from said pole tips by an air gap, and two field windings producing opposing and unequal magneto-motive forces, the stronger of said opposing field windings being wound on said first mentioned pole pieces, and the other of said opposing windings being wound upon the other pole pieces, said field windings being connected in shunt to said external circuit.

15. In a dynamo electric machine, a field magnet, an armature provided with a commutator, commutator brushes and connections forming for said brushes a local circuit for producing a secondary magnetic field and an external circuit, a winding for compensating for the armature reaction, and two field windings connected to produce opposing and unequal magneto-motive forces, the portion of the field magnet on which the stronger of said opposing field windings is wound being saturated, and the portion of the field magnet on which the other of said opposing windings is wound being unsaturated.

16. In a dynamo electric machine, a field magnet, an armature provided with a commutator, commutator brushes and connections forming for said brushes a local circuit for producing a secondary magnetic field and an external circuit, a winding connected in series with said external circuit for compensating for the armature reaction, and two field windings producing opposing and unequal magneto-motive forces, the portion of the field magnet on which the stronger of said opposing windings is wound being saturated, and the portion of the field magnet on which the other of said opposing windings is wound being unsaturated, said field windings being connected in shunt to said external circuit.

17. In a dynamo electric machine, a field magnet having a leakage path of low reluctance for the armature flux, an armature provided with a commutator, commutator brushes and connections forming for said brushes a local circuit for producing a secondary magnetic field and an external circuit, a winding for compensating for the armature reaction, and two field windings connected to produce opposing and unequal magneto-motive forces, the portion of the field magnet on which the stronger of said opposing field windings is wound being of restricted cross section so as to be saturated, and the portion of the field magnet on which the other of said opposing windings is wound being unsaturated.

18. In a dynamo electric machine, a field magnet having a leakage path of low reluctance for the armature flux, an armature provided with a commutator, commutator brushes and connections forming for said brushes a local circuit for producing a secondary magnetic field and an external circuit, a winding connected in series with said external circuit for compensating for the armature reaction, and two field windings producing opposing and unequal magneto-motive forces in inductive relation to said local circuit, the portion of the field magnet on which the stronger of said opposing windings is wound being of restricted cross section so as to be saturated, and the portion of the field magnet on which the other of said opposing windings is wound being unsaturated, said field windings being connected in shunt to said external circuit.

19. In a dynamo electric machine, a field magnet structure, an armature provided with a commutator, commutator brushes and connections forming for said brushes a local circuit for producing a secondary magnetic field and an external circuit, a winding for compensating for the armature reaction, said field magnet structure comprising a yoke, pole pieces having massive portions offering a path of low reluctance to the armature flux and connecting portions of restricted cross section between the yoke and said massive portions, and other pole pieces, and two field windings connected to produce opposing and unequal magneto-motive forces, the stronger of said opposing field windings being wound on said first mentioned pole pieces, and the other of said opposing windings being wound on said other pole pieces.

20. In a dynamo electric machine, a field magnet structure, an armature provided with a commutator, commutator brushes and connections forming for said brushes a local circuit for producing a secondary magnetic field and an external circuit, a winding connected in series with said external circuit for compensating for the armature reaction, said field magnet structure comprising a yoke, pole pieces having massive portions offering a path of low reluctance to the armature flux and connecting portions of restricted cross section between said yoke and said massive portions, and other pole pieces, and two field windings producing opposing and unequal magneto-motive forces, the stronger of said opposing field windings being wound on said first mentioned pole pieces, and the other of said opposing windings being wound on said other pole pieces, said field windings being connected in shunt to said external circuit.

21. In a dynamo electric machine, a field magnet structure, an armature provided with a commutator, commutator brushes and connections forming for said brushes a local circuit for producing a secondary magnetic field and an external circuit, a winding for compensating for the armature reaction, said field magnet structure comprising a yoke, pole pieces having extending pole tips and connecting portions of restricted cross section between the yoke and pole tips, and other pole pieces of large cross section extending between the yoke and said pole tips but separated from said pole tips by an air gap, and two field windings connected to produce opposing and unequal magneto-motive forces, the stronger of said opposing field windings being wound on said first mentioned pole pieces, and the other of said opposing windings being wound upon the other pole pieces.

22. In a dynamo electric machine, a field magnet structure, an armature provided with a commutator, commutator brushes and connections forming for said brushes a local circuit for producing a secondary magnetic field and an external circuit, a winding connected in series with said external circuit for compensating for the armature reaction, said field magnet structure comprising a yoke, pole pieces having extending pole tips and connecting portions of restricted cross section between the yoke and the pole tips, and other pole pieces of large cross section extending between the yoke and said pole tips but separated from said pole tips by an air gap, and two field windings producing opposing and unequal magneto-motive forces, the stronger of said opposing field windings being wound on said first mentioned pole pieces, and the other of said opposing windings being wound upon the other pole pieces, said field windings being connected in shunt to said external circuit.

In witness whereof, I have hereunto set my hand this 6th day of July, 1911.

ERNST F. W. ALEXANDERSON.

Witnesses:
BENJAMIN B. HULL,
MARGARET E. WOOLLEY.